United States Patent [19]

Orgun et al.

[11] Patent Number: 5,111,403
[45] Date of Patent: May 5, 1992

[54] TERRAIN COMPENSATION METHOD AND APPARATUS FOR AIRCRAFT AUTOMATIC LANDING SYSTEMS

[75] Inventors: Munir Orgun, Woodinville; Venkata R. Pappu, Kirkland; Alfredo A. Toledo, Jr., Seattle, all of Wash.

[73] Assignee: The Boeing Company, Seattle, Wash.

[21] Appl. No.: 470,927

[22] Filed: Jan. 26, 1990

[51] Int. Cl.$^5$ .............................................. G06F 15/50
[52] U.S. Cl. .................................... 364/428; 364/434; 73/178 T; 244/183
[58] Field of Search ............... 364/435, 428, 433, 434; 73/178 T; 244/180, 181, 182, 183

[56] References Cited

U.S. PATENT DOCUMENTS 3,604,908 9/1971 Loome et al. ........................ 244/182
3,934,221 1/1976 Bateman et al. .................... 244/182
3,958,218 5/1976 Bateman .............................. 244/182

Primary Examiner—Gary Chin
Attorney, Agent. or Firm—Christensen, O'Connor, Johnson & Kindness

[57] ABSTRACT

Disclosed is a method of and apparatus for generating a signal representative of aircraft gear altitude after the flare maneuver is initiated in an automatic landing procedure. In accordance with the invention, the gear altitude signal is produced by complementary filtering of the aircraft gear altitude signal and the aircraft inertial vertical acceleration signal, with the complementary filter frequency being varied so that the aircraft filtered gear altitude signal primarily is produced on the basis of the vertical inertial acceleration signals prior to the time at which the aircraft reaches the runway threshold and is primarily produced on the basis of the aircraft gear altitude signal after the aircraft crosses runway threshold. The result is the reduction of the filtered gear altitude signal variation that can be caused by irregular terrain along the landing approach path while maintaining signal sensitivity to runway slope and runway slope variation.

4 Claims, 2 Drawing Sheets

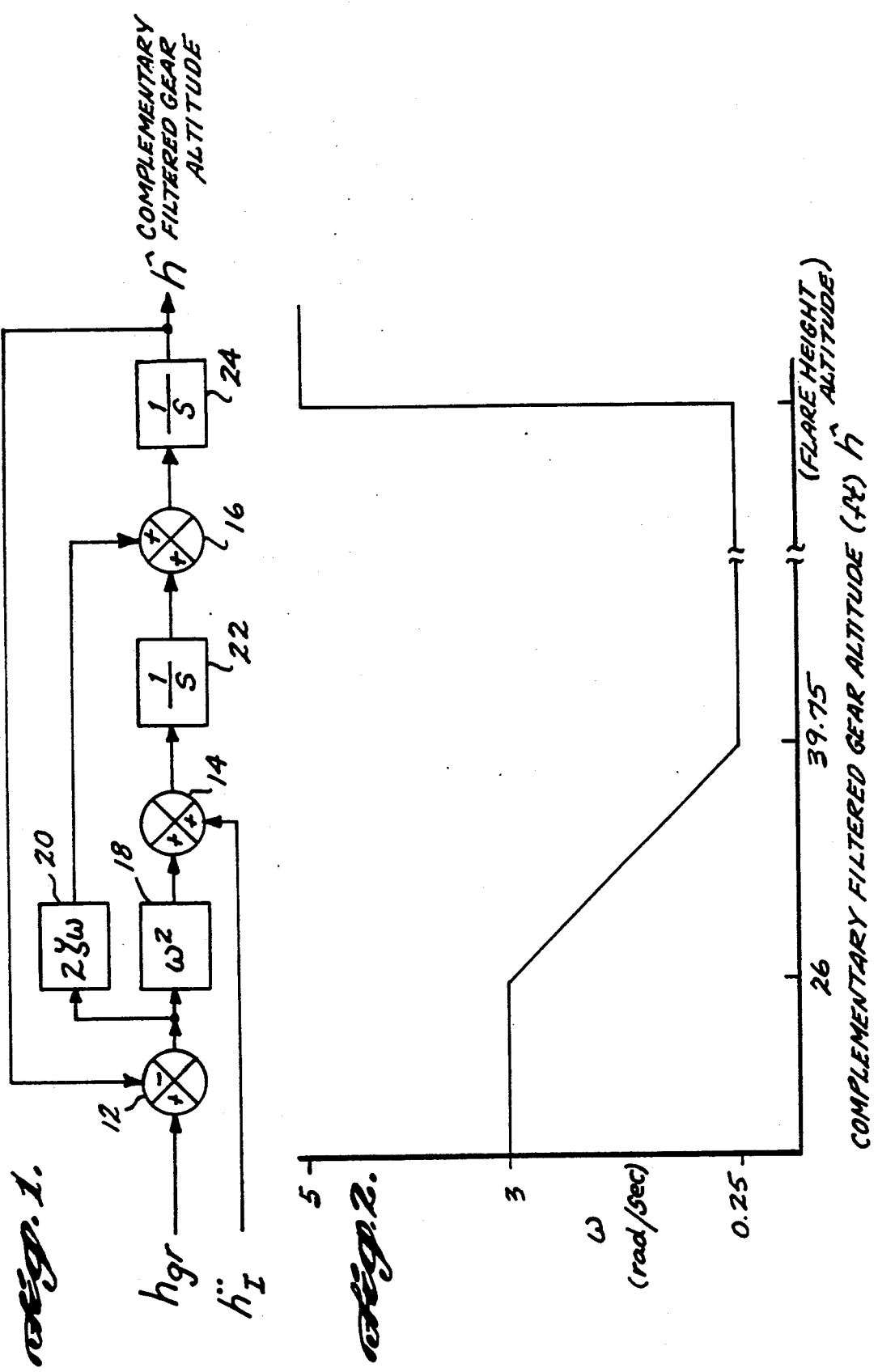

TERRAIN COMPENSATION METHOD AND APPARATUS FOR AIRCRAFT AUTOMATIC LANDING SYSTEMS

FIELD OF THE INVENTION

This invention relates to aircraft automatic landing systems and, more particularly, to methods and apparatus for rendering such systems less sensitive to ground terrain along the aircraft landing approach route while maintaining sensitivity to runway slope.

BACKGROUND OF THE INVENTION

Various automatic landing systems have become available during the past several years, often being incorporated in the aircraft autopilot or flight control system. Basically, these automatic landing systems are digital signal processors that execute control laws that cause the aircraft to follow glide slope and localizer signals so that the aircraft approaches the destination runway without manual control by the pilot. When the aircraft reaches a suitable point in its descent (e.g., aircraft landing altitude of 45 or 50 feet), the automatic landing system initiates a flare maneuver to arrest aircraft rate of descent (sink rate) so that the aircraft touches down on the runway at a proper position and at a suitable sink rate.

In general, prior art automatic landing systems have utilized the aircraft radio altimeter signal to measure landing gear altitude and, hence, initiate the flare maneuver during an automatic landing procedure. In addition, most of these automatic landing systems have utilized the aircraft radio altimeter signal throughout the automatic landing flare maneuver and maneuvering of the aircraft to a safe touchdown on the runway. Using a predetermined flare height initiation altitude (e.g., landing gear altitude of 45 or 50 feet) and the aircraft radio altimeter signal to measure landing gear altitude from the point of flare initiation to touchdown has resulted in certain disadvantages.

First, when the automatic landing flare maneuver is initiated at a fixed altitude of 45 or 50 feet, the aircraft typically begins the flare maneuver at a distance of 100 to 200 feet from runway threshold, with the exact distance in primary part being determined by the location of the glide slope transmitter and the glide slope beam angle for the landing facility at which the automatic landing is being executed. In some cases, however, initiation of the flare maneuver at a 45 or 50 foot aircraft gear altitude causes the aircraft to begin executing the flare maneuver on the order of 500 to 700 feet ahead of the runway threshold. Since the signal supplied by the radio altimeter system in effect follows the terrain along the approach path, irregular terrain near the end of the runway sometimes causes the landing system to unnecessarily execute a substantial amount of pitch attitude adjustments and control column activity prior to the time that the aircraft touches down on the runway. This relatively high degree of pitch attitude and control column activity can cause undue concern on the part of the aircraft pilot. In some cases, the pilot may unnecessarily assume manual control of the aircraft, even when the landing is being executed under low visibility conditions. Further, terrain induced changes in the aircraft radio altimeter signal may result in a relatively high aircraft sink rate at touchdown (i.e., a relatively hard landing). Such a hard landing may result in an undue degree of passenger concern, apprehension and discomfort. Even further, terrain induced variation in the radio altimeter signal can result in a longer than nominal touchdown distance (distance between the point of touchdown and runway threshold). In most situations, the disadvantages have been somewhat troublesome but have been such that the automatic landing system still met all safety and performance requirements. However, in some cases certain automatic landing system equipped aircraft have been prohibited from making automatic landings at certain landing facilities that have irregular landing approach terrain.

Various attempts have been made to at least partially alleviate the above-discussed disadvantages that are encountered when an automatic landing is made at a landing facility that has irregular approach terrain. For example, complementary filtering techniques have been used in which the aircraft radio altimeter signal is in effect combined with vertical acceleration signals produced by the aircraft inertial reference system to generate an aircraft gear altitude signal that provides improved system performance. As is known in the art, basically such complementary filtering constitutes low pass filtering of the radio altimeter signal and high pass filtering of the inertial vertical acceleration signal with the content of the filter output signal that is attributable to the radio altimeter signal and the inertial vertical acceleration signal being determined by the complementary filter frequency.

Prior attempts to use complementary filtering to provide improved automatic landing in the presence of terrain considerations have not been entirely successful. The basic reason is that the complementary filter frequency must be selected to compromise system performance that results under adverse approach terrain relative to system performance under other approach conditions. For example, many runways exhibit a relatively substantial slope that may be on the order of 2°-3°. Moreover, some runways exhibit considerable slope variation, initially sloping up or down and then sloping in the opposite direction. Such runway slope and slope variation induces gear height altitude changes as the aircraft executes the final phase of the automatic landing procedure. If the slope induced changes in altitude are not reflected in the aircraft gear altitude signal, the automatic landing may result in a relatively hard landing, may produce relatively high touchdown dispersion, and may exert substantial control column activity and/or substantial pitch attitude activity during the final phase of the landing procedure. Because of the compromise that must be made to accommodate both approach path terrain and runway slope, prior attempts to provide a gear altitude signal by complementary filtering of the radio altimeter signal and vertical acceleration signal have not resulted in the desired degree of improved system performance.

SUMMARY OF THE INVENTION

The invention provides a method of and apparatus for generating a gear altitude signal that exhibits minimal sensitivity to irregular terrain that is outside of and near the runway threshold, while maintaining maximal sensitivity to runway slope and slope variation. The method generally comprises use of complementary filtering techniques to establish a landing gear altitude signal that is primarily based on the aircraft inertial vertical acceleration signal prior to the time at which the aircraft reaches the runway threshold and primarily is based on the aircraft radio altimeter signal after the aircraft passes over the runway threshold. This is achieved by scheduling the frequency of the complementary filter as a function of estimated airplane position relative to runway threshold.

In the practice of the invention, the position of the aircraft relative to the runway threshold is estimated from the gear altitude signal that is produced by the complementary filtering. When the aircraft gear altitude is equal to or greater than a first predetermined value (approximately 40 feet in the currently preferred embodiments of the invention), the complementary filter frequency is established at a first predetermined value (0.25 radians per second in the currently preferred embodiments). This relatively low value of complementary filter frequency provides a filter output signal (gear altitude signal) that is weighted heavily in favor of the aircraft inertial vertical acceleration signal. The result is that, at gear heights above the first predetermined gear altitude (e.g., 40 feet and greater), the complementary filter largely eliminates the radio altimeter signal, which could include terrain induced signal variations.

In addition, in accordance with the invention, when the aircraft gear altitude is less than a second predetermined value (26 feet in the currently preferred embodiments of the invention), the complementary filter frequency is established at a second predetermined value (3 radians per second in the currently preferred embodiments). This relatively high value of complementary filter frequency provides a filter output signal (gear altitude signal) that is weighted heavily in favor of the aircraft radio altimeter signal. The result is that, for gear heights less than the second predetermined gear height value (e.g., 26 feet) the gear height signal produced by the invention will reflect altitude changes brought about by runway slope and any variation in runway slope.

In accordance with the invention, the complementary filter frequency established for values of gear height altitude that are between the first and second predetermined gear altitudes (approximately 40 and 26 feet in the currently preferred embodiments of the invention) are established so that the complementary filter frequency increases uniformly relative to decreases in the aircraft landing gear altitude. That is, the invention schedules a linear relationship between the complementary filter frequency and the gear altitude signal for all altitude signals that are less than the first predetermined gear altitude signal (40 feet) and greater than the second predetermined gear altitude signal (26 feet).

BRIEF DESCRIPTION OF THE DRAWINGS

The advantages and other aspects of the invention will be more fully understood by reference to the following detailed description when taken in conjunction with the accompanying drawings in which FIG. 1 is a block diagram that generally depicts complementary filtering of an aircraft radio altimeter signal and an aircraft inertial vertical acceleration signal FIG. 2 graphically depicts the manner in which the invention schedules complementary filter frequency relative to the aircraft gear altitude signal that is produced by the practice of the invention.

DETAILED DESCRIPTION

Figure 3:
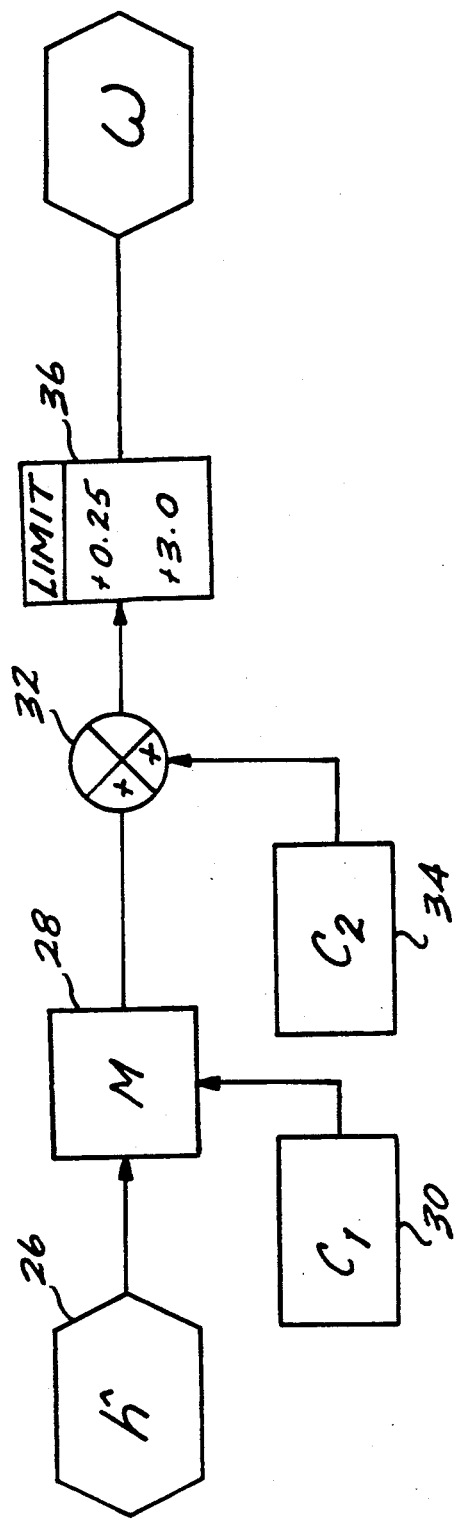
FIG. 3 is a block diagram that depicts the manner in which the aircraft gear altitude signal produced by the invention is processed to establish a complementary filter frequency in accordance with the schedule depicted in FIG. 2.

FIG. 1 is as block diagram that illustrates the signal processing employed in second order complementary filtering. It will be recognized by those skilled in the art that such filtering often is employed in automatic flight control systems in producing a signal representative of various parameters that relate to flight of the aircraft. More specifically, through complementary filtering, a signal that is accurate at low frequencies but exhibits undesirable high frequency characteristics (e.g., noise) can be combined with an independently derived signal that has good high frequency accuracy but undesirable low frequency characteristics (e.g., signal bias or drift) to produce a signal of relatively high accuracy throughout a wide range of frequencies.

The second order complementary filter representation shown in FIG. 1 includes: a subtractive summing network 12; first and second additive summing networks 14 and 16; first and second multipliers 18 and 20; and first and second integrators 22 and 24. As is known in the art, the aircraft radio altimeter signal (which is readily available in conventional automatic landing systems or can be supplied thereto by the radio altimeter) typically is converted to an aircraft gear altitude signal as a function of aircraft pitch altitude and aircraft geometry. In FIG. 1, a signal representative of aircraft gear attitude ($h_{gr}$) is supplied to the positive (+) input of the subtractive summing network 12. The output of the subtractive summing network 12 is supplied to the input terminals of both first and second multipliers 18 and 20. As is indicated in FIG. 1, multiplier 18 multiplies the signal supplied by subtractive summing network 12 by $\omega^2$ and multiplier 20 multiplies the signal supplied by subtractive summing network 12 by the quantity $2\zeta\omega$. As will be recognized by those skilled in the art, $\omega$ represents the complementary filter frequency and $\zeta$ represents the filter damping ratio. The output of multiplier 18 is connected to one input terminal of the first additive summing network 14. Connected to the second input terminal of additive summing network 14 is the aircraft inertial vertical acceleration signal, which is provided by the aircraft inertial reference system. The signal provided by first additive summing network 14 is integrated by integrator 22 and supplied to one input terminal of the second additive summing network 16. Connected to the second additive input terminal of additive summing network 16 is the signal supplied by multiplier 20. The output signal provided by second additive summing network 16 is integrated by integrator 24, with the integrated signal being fed back to the negative (−) input terminal of subtractive summing network 12 and, in addition, being provided as the complementary filter output signal, which is representative of aircraft gear altitude (identified as h in FIG. 1). Although not shown in FIG. 1, the signal provided at the output of the first integrator 22 can be utilized as a complementary filtered gear altitude rate signal should the automatic landing system that employs the filter require such a signal in establishing open loop gains or feedback for use during the automatic landing procedure.

It will be recognized by those skilled in the art that the second order complementary filter described relative to FIG. 1 exhibits a transfer function that corresponds to the following equation:

$$\hat{h} = \frac{\hat{h}_I}{s^2 + 2\zeta\omega s + \omega^2} + \frac{2\zeta\omega s + \omega^2}{s^2 + 2\zeta\omega s + \omega^2} h_{gr} \quad (1)$$

where $\hat{h}_I$ represents the aircraft inertial vertical acceleration signal, $h_{gr}$ represents the gear altitude signal, and the remaining parameters have been previously defined.

Since the radio altimeter signal and the inertial vertical acceleration signal are complementary signals, the complementary filtered gear altitude signal provided by the above-discussed filtering can be expressed as:

$$\hat{h} = \frac{h_I s^2}{s^2 + 2\zeta\omega s + \omega^2} + \frac{2\zeta\omega s + \omega^2}{s^2 + 2\zeta\omega s + \omega^2} h_{gr} \quad (2)$$

In view of Equation 2 it can be recognized that the complementary filtering in effect high pass filters a signal $h_I$ that is representative of aircraft gear altitude (formed by twice integrating the inertial vertical acceleration signal) and low pass filters the gear altitude signal $h_{gr}$, with both the high and low pass filter functions having a common cut-off frequency $\omega$.

In prior attempts to use complementary filtering to produce an automatic landing system gear altitude signal in automatic landing systems, the filter frequency was established at a constant value (e.g., 1). In accordance with this invention, the complementary filter frequency is scheduled as a function of the gear altitude signal $\hat{h}$ that is generated by the complementary filtering process. In the currently preferred schedule, which is depicted in FIG. 2: (a) the complementary filter frequency $\omega$ is a first predetermined constant value (3 radians per second) for all values of aircraft gear altitude that are less than a first predetermined gear altitude (26 feet in FIG. 2); (b) the complementary filter frequency is a second predetermined constant value (0.25 radians per second) for all gear altitudes that exceed a second predetermined value (39.75 feet in FIG. 2); and (c) the complementary filter frequency decreases linearly with respect to a unit increase in gear altitude for all values of gear altitude between the first and second predetermined values of gear altitude, i.e., for filtered complementary gear altitudes between 26 feet and 39.75 feet in FIG. 2, the relationship between the frequency of the complementary filter is a straight line having a slope of $-0.2$ radians per second per foot.

The first and second predetermined aircraft gear altitudes used in the complementary filter frequency schedule of FIG. 2 are selected for correspondence with an estimated location of the aircraft relative to runway threshold. More specifically, the purpose of scheduling the complementary filter frequency so that it changes between the first and second predetermined frequencies (0.25 radians per second and 3 radians per second in the currently preferred embodiments of the invention) is to obtain a complementary filtered gear altitude signal that primarily consists of the filtered radio altimeter signals after the aircraft reaches runway threshold and primarily consists of a gear altitude obtained by twice integrating the inertial vertical acceleration prior to the time at which the aircraft crosses the runway threshold. Since the current generation of transport and passenger aircraft are not equipped with equipment for measuring the distance between the aircraft and runway threshold, the invention uses the complementary filtered gear altitude signal as an estimate of the position of the aircraft. More specifically, in establishing the first and second predetermined complementary filtered gear altitudes used in the currently preferred embodiments of the invention, data that relates to the location of the glide slope signal transmitter, glide slope beam angle, and other factors that affect the relationship between aircraft gear altitude and runway threshold was considered for major landing facilities throughout the world. By applying statistical analysis techniques, it was determined that runway threshold will be reached at a gear altitude of approximately 40 feet for the vast majority of the currently available landing facilities and, in addition, it was determined that runway threshold always will be reached when the gear altitude is 26 feet. Accordingly, the predetermined gear altitude values of the currently preferred embodiments of the invention were set at 26 and 39.75 feet with a linear transition of complementary filter frequency being used for gear altitudes between these two values to insure smooth transmission between the two predetermined values of complementary filter frequency.

FIG. 3 diagrammatically depicts the manner in which the complementary filtered gear altitude signal $\hat{h}$ (indicated at block 26 in FIG. 3) is processed in accordance with the invention to implement the complementary filter frequency schedule of FIG. 2. As is indicated by multiplier 28 of FIG. 3, the complementary filtered gear altitude signal initially is multiplied by a constant $C_1$, which is shown at block 30 and corresponds to the slope of the complementary filter frequency relationship for gear altitude signals between the first and second predetermined gear altitude values ($C_1 = -0.2$ radians per second per foot in the currently preferred embodiments). The product of the complementary filtered gear altitude and the constant $C_1$ is then added to a second constant $C_2$ which represents the intercept value in a slope-intercept expression of the linear relationship of complementary filter frequency/complementary filtered gear altitude that is shown in FIG. 2. For the predetermined values of complementary filter frequency and gear altitude that are used in the currently preferred embodiments of the invention, the value of $C_2$ is equal to 8.2. In the diagram of FIG. 3, the additional step is indicated by additive summing network 32, with the intercept value $C_2$ being stored at block 34. The final step of generating the complementary filter frequency is limiting its value so that it is not greater than the first predetermined complementary filter frequency (3 radians per second in the currently preferred embodiments) and so that it is not less than the second predetermined complementary filter frequency (0.25 radians per second in the currently preferred embodiments). Limiting the complementary filter frequency signal is represented in FIG. 3 by limiter 36 which is connected for receiving the output signal provided by additive summing network 32.

The embodiments of the invention in which an exclusive property or privilege is claimed are defined as follows:

1. A method for supplying an aircraft landing gear altitude signal in an automatic landing system for use by said automatic landing system in controlling said aircraft during an automatic landing procedure, said method comprising:

estimating the position of said aircraft relative to the threshold of the runway at which said automatic landing procedure is being executed;

generating a complementary filtered signal representative of landing gear altitude by processing a radio altimeter based gear altitude signal and an inertial vertical acceleration signal; and establishing the complementary filter frequency at a first predetermined frequency when said estimated position of said aircraft is a first predetermined value and at a second predetermined frequency when said estimated position of said aircraft is a second predetermined value.

2. The method of claim 1 wherein said position of said aircraft relative to said threshold of said runway is estimated on the basis of said complementary filtered landing gear altitude signal generated by said processing of said radio altimeter based gear altitude signal and said inertial vertical acceleration signal.

3. The method of claim 2 wherein said step of establishing said complementary filter frequency includes the steps of:

establishing said complementary filter frequency at said first predetermined frequency when said complementary filtered signal representative of said aircraft landing gear altitude is less than a first predetermined value;

establishing said complementary filter frequency at said second predetermined frequency that is less than said first predetermined frequency when said complementary filtered signal representative of said aircraft landing gear altitude exceeds a second predetermined value that is greater than said first predetermined value of said complementary filtered signal representative of said landing gear altitude; and for all values of said complementary filtered signal representative of said aircraft landing gear altitude that are between said first and second predetermined values of said complementary filtered signal representative of said landing gear altitude, establishing said complementary filter frequency in accordance with a linear relationship between said complementary filter frequency and the value of said complementary filtered signal representative of said aircraft landing gear altitude.

4. The method of claim 3 wherein said first and second predetermined frequencies of said complementary filter are 3 radians per second and 0.25 radians per second and wherein said first and second predetermined values of said complementary filtered signal representative of said landing gear altitude are on the order of 26 feet and 40 feet.

* * * * *

UNITED STATES PATENT AND TRADEMARK OFFICE
CERTIFICATE OF CORRECTION

PATENT NO. : 5,111,403
DATED : May 5, 1992
INVENTOR(S) : M. Orgun et al.

It is certified that error appears in the above-identified patent and that said Letters Patent is hereby corrected as shown below:

| COLUMN | LINE | ERROR |
|---|---|---|
| 4 | 57 | "h" should read --$\hat{h}$--. |
| 5 (Equation (1)) | 2 & 3 | "$\hat{h} = \dfrac{\hat{h}_I}{s^2 + 2\xi ws + w^2}$" should read --$\hat{h} = \dfrac{\ddot{h}_I}{s^2 + 2\xi ws + w^2}$--. |
| 5 | 5 | "$\hat{h}_I$" should read --$\ddot{h}_I$--. |

Signed and Sealed this

Seventh Day of September, 1993

Attest:

BRUCE LEHMAN

*Attesting Officer*      *Commissioner of Patents and Trademarks*